TIME →

INVENTORS
WILLIAM H. LEE
ROGER H. STOTZER

BY

ATTORNEYS

United States Patent Office 3,527,995
Patented Sept. 8, 1970

3,527,995
**SINGLE-PHASE TO POLYPHASE
CONVERSION SYSTEM**
William H. Lee, Lakewood, and Roger H. Stotzer, Parma,
Ohio, assignors to Harris-Intertype Corporation, Cleveland, Ohio, a corporation of Delaware
Filed Apr. 12, 1967, Ser. No. 630,242
Int. Cl. H02m 5/14, 5/30
U.S. Cl. 321—7                                8 Claims

ABSTRACT OF THE DISCLOSURE

A motor is driven selectively from a three-phase power line to provide normal speed operation, or from a single-phase of the three-phase power line to provide low speed operation. The single-phase power is converted to a lower frequency determined by the frequency of a reference signal whose envelope determines the times that a conductive device becomes operative to conduct the single-phase power wave to the motor during a half-cycle of the power wave. The conduction of the conductive device during a half-cycle is effected by a firing signal which is provided by energy circuit means which is set to integrate the energy applied thereto and provide a firing signal in response to a predetermined amount of energy. The reference signal is applied to the energy circuit means to provide the energy and the energy circuit means is reset at the beginning of each half-cycle of a signal power wave.

---

This invention relates to improvements in an electrical conversion system for converting a cyclically varying power signal to an energization signal of greatly reduced frequency and power, and to a printing press motor energization arrangement embodying such a system.

In the use of printing presses, certain functions of the press itself or of auxiliary equipment associated with the press require a low speed drive. For example, during the cleanup and "make ready" periods the rolls in the press should be driven at a much lower speed than their normal speed when the press is running. The same is true when the cylinders for different colors in a multi-color printing press are being adjusted for precise running registration. Also, feeder and delivery elevators at the inlet and outlet ends of the press are required respectively to raise and lower slowly a stack of sheets while the press is running. For these purposes, in the past various reduction gear and clutch arrangements have been used to provide a low speed drive from a high speed A.C. motor, but such arrangements did not provide for selective adjustment of low output speed and they were relatively bulky and expensive.

The present invention is directed to a conversion system which is especially advantageous for use in providing a low speed drive in printing presses, as well as in other environments apart from printing presses. In accordance with the present invention, an input power signal whose amplitude varies cyclically at a substantially constant frequency is converted to an energizing signal whose effective frequency and power are much lower than that of the input power signal, so that this energizing signal will cause a motor to run at a correspondingly reduced speed. This is achieved in the present invention by controlling or modulating the time-width of each cyclic variation of the input power signal which is passed as an energization signal to the motor. This time-width modulation is in response to triggering signals whose firing angle (i.e., time of occurrence) during each cyclic variation of the input power signal is controlled in accordance with a reference signal whose amplitude varies cyclically at a frequency which is substantially lower than that of the input power signal. With this arrangement, the integrated volt-seconds of the energizing signal varies cyclically at the frequency of the reference signal.

A particular advantage of the present invention is that the reference signal is not required to amplitude-modulate the input power signal, and therefore the reference signal may be a low-power signal and still it will determine the effective frequency and reduced power of the energization signal in the desired manner.

Another advantage of the present invention is that the reference signal frequency may be selectively varied by the user so as to adjust the power input to a motor during a given interval of time, and therefore the speed at which the motor operates.

Another advantage of the present invention is that the motor cannot "run away" while it is being energized by the present system, whereas this is not the case with certain D.C. motor drives proposed for printing presses.

A further advantage of the present invention resides in its use of simplified control circuitry embodying solid-state semiconductor devices of high reliability and other standardized circuit elements of relatively low cost and proven performance characteristics, with no moving parts being involved.

It is a principal object of this invention to provide a novel and improved system for converting a power signal whose amplitude varies cyclically at a substantially constant frequency to an output signal having a substantially lower effective frequency and power.

Another object of this invention is to provide such a system in which the effective frequency of the output signal may be adjusted readily.

Another object of this invention is to provide such a system which is especially advantageous for controlling the energization of a printing press motor to provide a reduced speed of its operation.

Another object of this invention is to provide such a system which is especially adapted to control the reduced speed operation of a three-phase A.C. motor from a single-phase A.C. power source.

Another object of this invention is to provide a novel and improved firing circuit for use in such a system to control the firing angle of a triggering signal in accordance with the amplitude of a cyclically-varying reference signal in a novel and advantageous manner.

Another object of this invention is to provide such a system which enables the effective frequency and power of an energization signal to be controlled by a reference signal of much lower power than the input power signal.

Further objects and advantages of the present invention will be apparent from the following detailed description of a presently-preferred embodiment thereof, taken with reference to the accompanying drawings.

Figure 1:
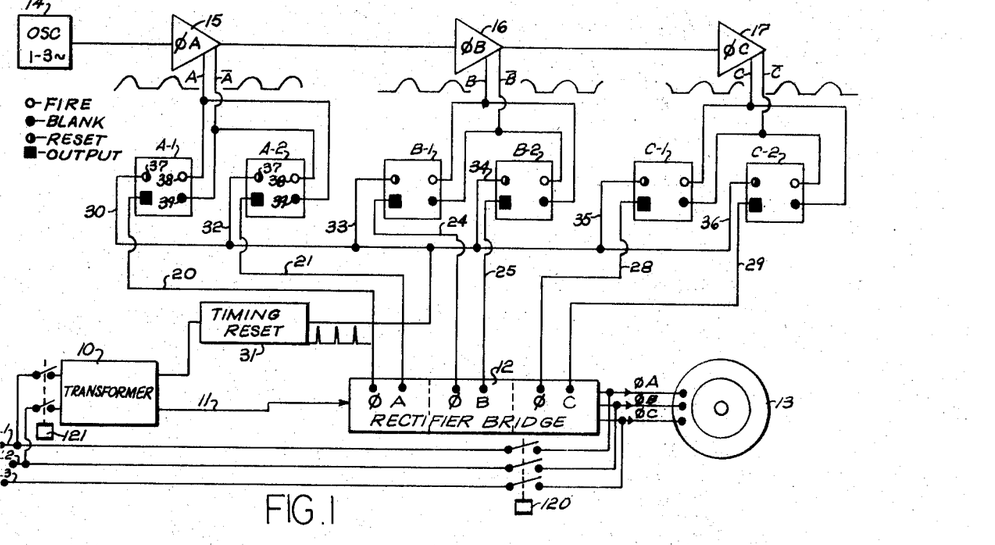
FIG. 1 is a schematic block diagram showing one embodiment of the present system.

GENERAL DESCRIPTION—FIG. 1

Referring first to FIG. 1, in broad outline the particular system illustrated schematically there comprises a step-down transformer 10 having its primary connected to a single-phase power signal source for producing a power signal whose amplitude varies cyclically at a substantially constant frequency. The secondary of this transformer is connected through an output, designated generally by the line 11, to each phase of a three-phase rectifier bridge 12, which is the conversion circuit in the present system and will be described in detail with reference to FIG. 3. The three different phase output signals from this bridge are applied to either the primary or secondary circuit of an electric motor 13, which is to be energized by the present system for reduced speed operation. As described in detail hereinafter, the time interval during which a particular half cycle of the high power, 60 cycle per second power supply voltage is actually applied as an energization signal to the motor 13 is modulated, or controlled, in accordance with a low-power reference signal of substantially lower frequency than the 60 cycle per second power supply signal, as explained hereinafter. The volt-seconds of those portions of successive half cycles of the power supply signal which are actually passed to the motor are integrated by the motor so that it runs at a reduced speed corresponding to the frequency of the low frequency, low power reference signal.

The source of these low frequency, low power reference signals is a sine wave oscillator 14 of any desired design, whose output is connected to successive phase amplifiers 15, 16, and 17. Preferably, the oscillator frequency may be adjusted in a known manner.

The "phase A" amplifier 15 produces on its output line A a signal which is a positive half-cycle of a sine wave for every other half-cycle of the output signal from oscillator 14 and is zero for the remaining half-cycles, and a similar output signal on its output line $\overline{A}$ which is phase displaced 180° from the output signal on line A. That is, the positive sinusoidal half-cycles on line $\overline{A}$ are 180° out of phase with the positive sinusoidal half-cycles on line A, and a positive half-cycle appears on line $\overline{A}$ when the signal on line A is zero, and vice versa. Both of these signals on lines A and $\overline{A}$ have the same low frequency as the oscillator 14.

The "phase B" amplifier 16 produces a similar output signal on its output line B which is phase displaced 120° in time behind the signal on line A, and also a similar output signal on line $\overline{B}$ which is phase displaced 180° from the signal on line B. Both of these signals on lines B and $\overline{B}$, respectively, have the same low frequency as the oscillator 14.

The "phase C" amplifier 17 produces a similar output signal on line C which is phase displaced 240° in time behind the signal on line A, and also a similar output signal on line $\overline{C}$ which is phase displaced 180° from the signal on line C. Both of these signals on lines C and $\overline{C}$, respectively, have the same low frequency as the oscillator 14.

The signal on line A is applied as a firing signal to a first firing circuit, designated generally by the block A–1 in FIG. 1, and at the same time as a blanking signal to a similar second firing circuit A–2. The signal on line $\overline{A}$ is applied as a blanking signal to the first firing circuit A–1 and at the same time as a firing signal to the second firing circuit A–2. The first firing circuit A–1 has an output, designated generally by the line 20 in FIG. 1, which is connected to the phase A components of the rectifier bridge 12. Similarly, the second firing circuit A–2 has an output, designated generally by line 21, which is connected to the phase A components of the rectifier bridge 12. Each firing circuit may produce a triggering signal at its output during the positive half cycle of its input firing signal but it cannot produce such a triggering signal during the next half-cycle when it is receiving a blanking signal, as explained hereinafter.

The signal on line B is applied as a firing signal to a third firing circuit B–1 and at the same time as a blanking signal to a fourth firing circuit B–2. The signal on line $\overline{B}$ is applied as a blanking signal to the third firing circuit B–1 and at the same time as a firing signal to the fourth firing circuit B–2. The third firing circuit B–1 has an output, designated generally by line 24, which is connected to the phase B components of the rectifier bridge 12. The fourth firing circuit B–2 has an output, designated generally by line 25, which is also connected to the phase B components of the rectifier bridge 12.

The signal on line C is applied as a firing signal to a fifth firing circuit C–1 and at the same time as a blanking signal to a sixth firing circuit C–2. The signal on line $\overline{C}$ is applied as a blanking signal to the fifth firing circuit C–1 and at the same time as a firing signal to the sixth firing circuit C–2. The fifth firing circuit C–1 has an output, designated generally by line 28, which is connected to the phase C components of the rectifier bridge 12. The sixth firing circuit C–2 has an output, designated generally by line 29, which is connected to the phase C components of the rectifier bridge 12.

The six firing circuits A–1, A–2, B–1, B–2, C–1 and C–2 are all identical and are described in detail hereinafter with reference to FIG. 2.

The first firing circuit A–1 receives a timing reset signal pulse on line 30 in FIG. 1. This reset signal pulse has a pulse repetition rate of 120 cycles per second and it is obtained from a timing reset circuit 31, which receives a 60 cycle per second output signal from the transformer 10. Every time this 60 cycle per second signal crosses the zero axis (that is, every time it changes from positive to negative, or vice versa), the timing reset circuit delivers a positive pulse of extremely short duration to line 30.

Similarly, the timing reset circuit 31 applies these same reset pulses simultaneously via lines 32, 33, 34, 35, and 36, respectively, to the second, third, fourth, fifth, and sixth firing circuits, A–2, B–1, B–2, C–1 and C–2, respectively.

These reset pulses and the low frequency sinusoidal, half-cycle firing and blanking signals control the operation of the respective firing circuits such that each firing circuit delivers output signals via the respective output 20, 21, 24, 25, 28, or 29 to the rectifier bridge 12 which will variably modulate the width of the 60 cycle per second power supply voltage delivered by the rectifier to the motor, as explained hereinafter.

Figure 2:
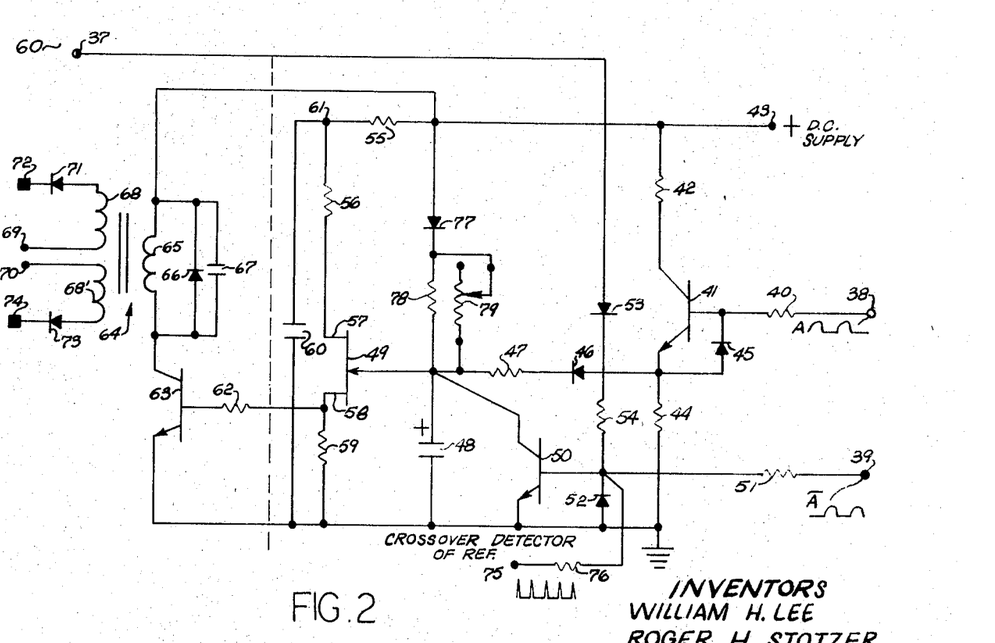
FIG. 2 is a schematic circuit diagram showing one of the firing circuits in the FIG. 1 system.

FIRING CIRCUIT—FIG. 2

Referring to FIG. 2, each firing circuit has a reset signal pulse input terminal 37 connected to the respective reset signal input line 30, 32, 33, 34, 35, or 36 to receive positive reset pulses having a pulse repetition rate of 120 cycles per second. Each firing circuit also has a firing signal input terminal 38 connected to the respective line, A, $\overline{A}$, B, $\overline{B}$, C, or $\overline{C}$ to receive a positive half sine wave reference signal at the low frequency of the oscillator 14. Also, each firing circuit has a blanking signal input terminal 39 connected to the respective line $\overline{A}$, A, $\overline{B}$, B, $\overline{C}$, or C to receive a positive half sine wave signal at the low frequency of the oscillator 14.

The firing signal input terminal 38 is connected through a resistor 40 to the base of a first transistor 41, which will be referred to as the "charging" transistor. The collector of this charging transistor is connected through a resistor 42 to a positive D.C. power supply terminal 43, which may be at 24 volts. The emitter of this transistor is connected through a resistor 44 to ground. A semiconductor rectifier diode 45 is connected between the emitter and base of transistor 41 to prevent the emitter from going positive with respect to the base.

The emitter of the charging transistor 41 is connected through a semi-conductor rectifier diode 46 and a resistor 47, in series with diode 46, to the upper terminal of a capacitor 48 and to the control electrode (emitter) of a unijunction transistor 49. The lower terminal of capacitor 48 is grounded.

A semi-conductor rectifier diode 77 and a resistor 78 are connected in series with each other between the positive power supply terminal 43 and the upper terminal of capacitor 48. An adjustable potentiometer 79 is connected across resistor 78. Resistor 78 has an ohmic resistance several times (e.g., ten times) that of resistors 47 and 42 combined, and the maximum resistance of potentiometer 79 is many times that of resistor 78, so that over a wide range of adjustment of this poteniometer the effective resistance presented by the parallel-connected resistor 78 and potentiometer 79 is substantially greater than that of the resistors 42 and 47 which are connected in series with each other through the collector-emitter path of transistor 41. Therefore, the principal charging circuit for capacitor 48 is through resistor 42, the charging transistor 41 and resistor 47. Diode 77 and the parallel-connected resistor 78 and potentiometer 79 provide a secondary charging circuit for capacitor 48 which passes only a minor fraction of the charging current. The adjustability of potentiometer 79 in this secondary charging circuit enables the overall rate of charging to be adjusted by the user.

A second transistor 50, referred to hereinafter as the "reset" transistor, has its emitter grounded and its collector connected to the upper terminal of capacitor 48. The blanking signal input terminal 39 is connected through a resistor 51 to the base of the reset transistor 50. A semi-conductor rectifier diode 52 is connected across the emitter and base of the reset transistor 50 to prevent the emitter from going positive with respect to the base.

The reset signal input terminal 37 is connected through a semi-conductor rectifier diode 53 and a resistor 54, in series with this diode, to the base of the reset transistor 50.

The positive D.C. power supply terminal 43 is connected through a pair of series-connected resistors 55 and 56 to one of the output electrodes 57 of the unijunction transistor 49. The other output electrode 58 of the unijunction transistor is connected through a resistor 59 to ground.

A capacitor 60 has its upper terminal connected to the juncture 61 between resistors 55 and 56. The lower terminal of this capacitor is grounded.

The lower output electrode 58 of the unijunction transistor 49 is connected through a resistor 62 to the base of an output transistor 63. The emitter of this output transistor 63 is grounded. An output transformer 64 has its primary winding 65 connected between the positive D.C. power supply terminal 43 and the collector of the output transistor 63. A semi-conductor rectifier diode 66 and a capacitor 67 are connected in parallel with each other across the transformer primary winding 65. The diode 66 discharges the energy in this winding in the event that the lower end of the winding tends to become positive with respect to its upper end.

The secondary winding of the output transformer 64 has two windings 68 and 68'. The winding 68 has its lower end in FIG. 2 connected to an output terminal 69 and its upper end connected through a semi-conductor rectifier diode 71 to an output terminal 72. The polarity of this diode is such that only current of positive polarity can pass from the secondary winding 68 to the output terminal 72. The other secondary winding 68' has its upper end connected to an output terminal 70 and its lower end connected through a semi-conductor rectifier diode 73 to an output terminal 74. The polarity of diode 73 is such that only current of positive polarity can pass from the secondary winding 68' to the output terminal 74. The arrangement of the transformer windings is such that current is passed to both output terminals 72 and 74 in response to positive current flow through the primary winding 65 from top to bottom in FIG. 2.

The firing circuit also has an input terminal 75 which is connected through a resistor 76 to the base of the blanking transistor 50. This input terminal 75 is coupled to the respective phase amplifier 15, 16, or 17 through suitable circuitry which provides a pulse at terminal 75 each time the low frequency firing signal at the input terminal 38 of this firing circuit reaches the zero axis (that is, each time this firing signal changes from positive to zero or vice versa).

In the operation of this firing circuit, assume that the input terminal 38 is receiving a low frequency, sinusoidal positive half-cycle firing signal over the respective input line. During this half-cycle there will be no blanking signal at the input terminal 39 because, as already stated, the blanking signal is zero throughout the positive half cycle of the firing signal.

The positive firing signal is applied to the base of the firing transistor 41, turning on this transistor to pass current from the positive power supply terminal 43 through resistor 42, the collector-emitter path of transistor 41, and through resistor 44 to ground. The collector-emitter current flow through transistor 41 is proportional to the instantaneous amplitude of the incoming low frequency firing signal applied to the base of transistor 41. Consequently, due to the voltage drop across resistor 44 to ground the emitter of transistor 41 becomes positive with respect to ground, with its positive potential being proportional to the instantaneous amplitude of the incoming firing signal.

This positive signal at the emitter of transistor 41 is applied through diode 46 and resistor 47 to the upper terminal of capacitor 48 and to the control electrode of the unijunction transistor 49. The upper terminal of capacitor 48 and the control electrode of the unijunction transistor 49 are also charged positive through the secondary charging circuit which includes diode 77, resistor 78, and potentiometer 79.

Figure 4:
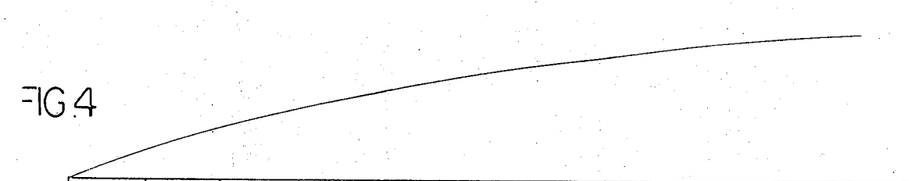
FIG. 4 shows the voltage at the emitter of the charging transistor in the FIG. 2 firing circuit plotted against time during several cyclic variations of the input power signal.

FIG. 4 shows the voltage at the emitter of the charging transistor 41 plotted against time for substantially less than a half-cycle of the incoming low frequency firing signal. It will be understood that this voltage is approximately a sinusoidal half-cycle having the same low frequency as the firing signal input on line A.

Figure 5:
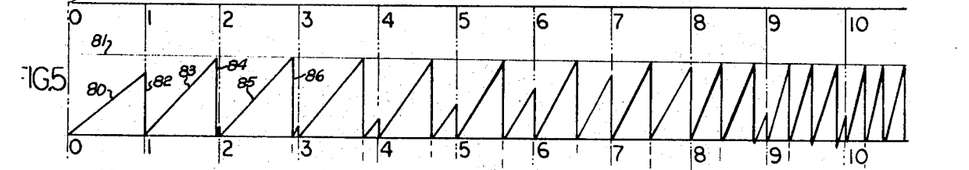
FIG. 5 is a similar plot showing the charge on the firing capacitor in the FIG. 2 firing circuit, plotted along the same time scale.

FIG. 5 shows the voltage on the upper terminal of capacitor 48 plotted against time, the time scale (along the horizontal axis) being the same as that of FIG. 4.

Figures 6, 7:
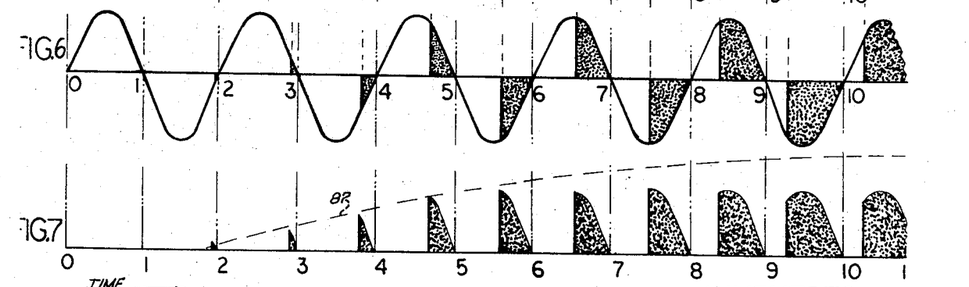
FIG. 6 is a plot showing the amplitude of the A.C. power input signal, taken along the same time scale, with the darkened areas indicating the volt-second segments of this input power signal actually passed to the motor.
FIG. 7 is a plot showing the negative volt-second segments of the power signal inverted and also showing by a dashed-line curve the integral or summation of these volt-second segments of the input power signal.

FIG. 6 shows a plot of the 60 cycle per second power supply voltage at the input 11 to the rectifier bridge 12 (FIG. 1) plotted against time, the time scale being the same as that of FIGS. 4 and 5. As already explained, each time this power supply voltage crosses the horizontal axis (that is, each time it changes from positive to negative, or vice versa) a timing reset pulse is delivered to the reset terminal 37 of the FIG. 2 firing circuit.

Referring again to FIGS. 4 and 5, the rate at which the capacitor 48 is charged depends upon the voltage then prevailing at the emitter of the charging transistor 41, which, in turn, is proportional to the instantaneous amplitude of the incoming firing signal. The higher this voltage, the faster will be the charging rate. For example, during the 1/120 second between times 0 and 1 on the time scale in FIGS. 4 and 5, the gradually increasing voltage at the emitter of transistor 41 causes the upper terminal of capacitor 48 to charge up at a relatively slow rate, designated by the line 80 in FIG. 5.

To simplify the drawing, this charging curve 80 is shown as a straight line. However, it is to be understood that it actually has a non-linear curvature due to the known inherent characteristics of R-C charging circuits generally.

The horizontal line 81 spaced above the base line in FIG. 5 represents the voltage required at the control electrode of the unijunction transistor 49 to turn the latter on, which depends upon the intrinsic standoff ratio of the unijunction transistor. At time 1 in FIG. 5 (i.e., at the end of the first half-cycle of the 60 cycle per second power supply voltage), a positive reset pulse will appear on the reset input terminal 37 of the firing circuit (FIG. 2). This reset pulse is applied, via diode 53 and resistor 54, virtually instantaneously to the base of the reset transistor 50, turning on this transistor for positive current flow from the upper terminal of capacitor 48 through the collector-emitter path of the reset transistor 50 to the grounded lower terminal of capacitor 48. Because transistor 50 provides an extremely low impedance path for this current, the capacitor 48 is discharged substantially instantaneously, as indicated by the almost vertical voltage line 82 in FIG. 5.

As shown in FIG. 5, the conditions assumed are such that the capacitor 48 has been discharged at time 1, in response to the reset pulse occurring at the end of the first half-cycle of the 60 c.p.s. power supply voltage, before its voltage has reached the positive value designated by line 81. Therefore, the unijunction transistor 49 has remained non-conducting during this first half-cycle, as did the output transistor 63. Therefore, no output signal has been applied to the output transformer 64.

After the reset signal pulse at terminal 37 has disappeared and the reset transistor 50 has turned off again (that is, at the beginning of the next half-cycle of the 60 c.p.s. power supply voltage), the potential on the upper terminal of capacitor 48 will again increase progressively, this time at a faster rate because of the progressively increased voltage at the emitter of the charging transistor 41. That is, the slope of the voltage curve for capacitor 48 in this second half-cycle will be greater than during the first half-cycle, as indicated by the voltage line 83 in FIG. 5.

Here the conditions assumed are such that the potential at the upper terminal of capacitor 48 and at the control electrode of the unijunction transistor 49 reaches the unijunction turn-on voltage 81 just shortly before the power supply voltage crosses the zero axis again (i.e., just before time 2). Consequently, the unijunction transistor 49 will be turned on, conducting current between its output electrodes 57 and 58 and applying a turn-on current to the output transistor 63. The positive charge which has accumulated on the upper terminal of capacitor 60 is now discharged abruptly through resistor 56, the unijunction transistor 49 and resistor 59 to the grounded lower terminal of capacitor 60. The unijunction transistor 49 is particularly advantageous in this firing circuit because it takes very little power, is relatively inexpensive and is stable. The unijunction transistor turns off its current flow when the voltage at its emitter or control electrode drops below a certain level.

When the output transistor 63 turns on, a pulse of energy passes from the D.C. power supply terminal 43 through the primary winding 65 of transformer 64 and through the collector-emitter path of the now-conducting transistor 63 to ground. That is, transistor 63 acts as a switch in series with the transformer primary winding 65. Before transistor 63 conducts current, substantially all of the voltage drop between the positive power supply terminal 43 and ground appears across the collector-emitter path of this transistor, and the voltage across the transformer primary winding 65 is substantially zero. After transistor 63 is turned on, substantially all of the voltage drop from terminal 43 to ground appears abruptly across the transformer primary winding 65.

As already stated such an abrupt voltage change across the transformer primary winding 65 induces across the secondary winding 68 a voltage which is + to − from top to bottom in FIG. 2 and induces across the other secondary winding 68' a voltage which is + to − from its bottom to top in FIG. 2. This causes a positive current pulse to appear on the output terminal 72 and a positive current pulse to appear on the output terminal 74.

Referring again to FIG. 5, it has been stated that the firing circuit has produced a discharge of the capacitor 48 shortly before time 2 and that this discharge has produced positive current pulses at the output terminals 72 and 74. This discharge of the capacitor 48 is designated by the almost vertical descending line 84 in FIG. 5. At the completion of this discharge, which takes place very quickly, the upper terminal of capacitor 48 again begins to be charged positive, but before it can again reach the level indicated by line 81, the next reset pulse appears on the reset terminal 37 because now (at time 2) the 60 cycle per second power supply voltage (FIG. 6) is again crossing the zero axis, in this instance changing from negative to positive. This reset pulse turns on the reset transistor 50 to discharge the capacitor 48.

Now, at time 2, the upper terminal of capacitor 48 again begins to be charged positive, as indicated by the line 85 in FIG. 5, at a progressively increasing rate because the voltage at the emitter of the charging transistor 41 is continuing to increase. The charge on capacitor 48 reaches the level of line 81 more rapidly than in the preceding time interval (from time 1 to time 2), and then the capacitor is discharged in the manner previously described in detail to produce output pulses at the output terminals 72 and 74. This discharge of the capacitor 48 is indicated by line 86 in FIG. 5. The capacitor 48 is then charged again until the next reset pulse appears at terminal 37, at time 3, when the 60 cycle per second power supply voltage again crosses the zero axis (this time, going from positive to negative).

The operation of the firing circuit is similar during each succeeding half-cycle of the 60 cycle per second power supply voltage, with the first discharge of capacitor 48 taking place progressively earlier during each of these half-cycle intervals due to the increasing potential at the emitter of the charging transistor 41. Eventually (for example, in the half-cycle of the power supply signal between time 8 and time 9 in FIG. 5) the capacitor 48 will be fully charged and discharged more than once during one half-cycle of the power supply signal.

However, the significant factor is that the time of the *first* discharge of capacitor 48 takes place earlier in the half-cycle of the power supply voltage for each succeeding half cycle as long as the low frequency firing signal coming into terminal 38 is increasing in magnitude, that is, throughout the first quarter-cycle, or 90°, of this low frequency firing signal. This first discharge of the capacitor 48 determines how much of that half-cycle of the 60 cycle per second power supply voltage will pass through the rectifier bridge 12 to the motor 13, as explained hereinafter.

FIG. 6 shows successive half-cycles of the 60 cycle per second power supply voltage. The shaded area in each half-cycle represent the volt-second of that half-cycle *after* the first discharge of the capacitor 48 which resulted in an output pulse at the output terminals 72 and 74 of the firing circuit.

FIG. 7 shows the shaded areas of the negative half-cycles inverted, so that each shaded area is positive in sign. The dashed line 87 in FIG. 7 represents the integral of these shaded areas, and it will be seen that this integral or summation of the total effective volt-seconds represented by the shaded areas is substantially a sine wave having the same frequency as that of the low frequency firing signal depicted in FIG. 4. The motor 13 itself produces this integration, so that the motor responds as if it were being energized by a low frequency sine wave as shown in FIG. 7 at 87.

Conversely, after the low frequency firing signal coming into terminal 38 begins to decrease in magnitude (that is, during the second quarter-cycle of this signal), the potential at the emitter of the charging transistor 41 will decrease accordingly. Consequently, the capacitor 48 will be charged at a progressively slower rate during each succeeding half-cycle of the 60 cycle per second power supply voltage, and the first discharge of capacitor 48 will take place progressively later during each of these succeeding half-cycles. Therefore, each of these succeeding half-cycles will have a progressively diminished shaded area and the integrated volt-seconds applied to the respective field winding of the motor will complete the positive half-cycle of the low frequency sine wave which is shown partially at 87 in FIG. 7.

The foregoing description relates to the operation of each firing circuit A–1, A–2, B–1, B–2, C–1, or C–2 during the positive half-cycle of the low frequency firing signal which it receives via the respective input line A, $\overline{A}$, B, $\overline{B}$, C, or $\overline{C}$. While this firing signal is positive, the blanking signal which this firing circuit receives via the respective line $\overline{A}$, A, $\overline{B}$, B, $\overline{C}$, C is zero.

During the next half-cycle of the low frequency firing signal, however, the firing signal will be zero and the blanking signal will be the positive half of a sine wave. This blanking signal is applied (FIG. 2) through the blanking signal input terminal 39 and resistor 51 to the base of the reset transistor 50, causing this transistor to turn on and to remain on throughout this low frequency half-cycle, thereby substantially shortcircuiting the capacitor and preventing its upper terminal from being charged positive. Consequently, during this low frequency half-cycle no output signal appears on the output terminals 72 and 74 of this particular firing circuit.

Referring again to FIG. 1, it will be apparent that the two firing circuits A–1 and A–2 for phase A of the low frequency, low power reference signal operate alternately. That is, during one half-cycle of this low frequency signal, A–1 is fired and A–2 is blanked. Conversely, during the next half-cycle of this low frequency reference signal, A–2 is fired and A–1 is blanked.

This is also true as between the two firing circuits B–1 and B–2 for the B phase of the low frequency reference signal, and as between the two firing circuits C–1 and C–2 for the C phase of this signal. Also, it will be remembered that the B phase of this signal lags the A phase by 120°, and the C phase of this signal lags the A phase by 240°.

These phase relationships insure that either a B phase firing circuit or a C phase firing circuit will be receiving a firing signal throughout the half-cycle when an A phase firing circuit is receiving a firing signal. For example, during the first half-cycle of phase A (when firing circuit A–1 is receiving a firing signal) the B phase firing circuit B–2 will receive a firing signal for the first 120°, and the C phase firing circuit C–2 will receive a firing signal for the final 60°, as shown by the corresponding wave forms in FIG. 1 at the firing terminal input lines A, $\overline{B}$, and $\overline{C}$, respectively. Similarly, throughout the half-cycle when either B phase firing circuit B–1 or B–2 is receiving a firing signal, an A phase firing circuit will receive a firing signal part of the time and a C phase firing circuit will receive a firing signal the remainder of the time. Also, throughout the half-cycle when either C phase firing circuit C–1 or C–2 is receiving a firing signal, an A phase firing circuit will receive a firing signal part of the time and a B phase firing circuit will receive a firing signal the remainder of the time.

Figure 3:
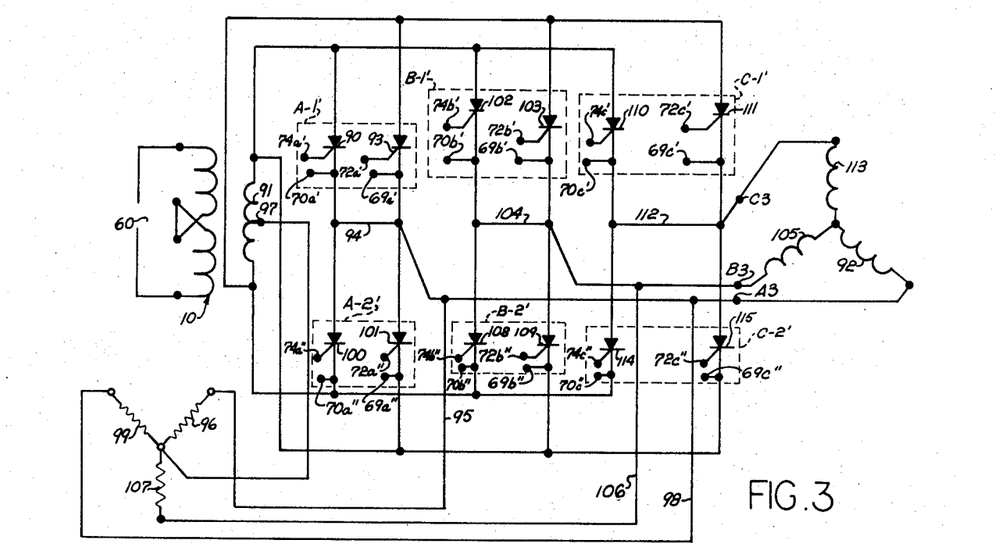
FIG. 3 is a schematic circuit diagram showing the three-phase rectifier bridge in the FIG. 1 system.

CONVERSION CIRCUIT—FIG. 3

Referring to FIG. 3, the conversion circuit designated by the block 12 in FIG. 1, is a three-phase rectifier bridge which comprises three different phase groups of four silicon-controlled rectifiers each, there being one pair of SCR's for each of the six firing circuits A–1, A–2, B–1, B–2, C–1, and C–2 in FIG. 1.

The pair of SCR's connected to the output of the A–1 firing circuit are enclosed by the dashed line block designated A–1' in FIG. 3. A similar "prime" designation is given to each of the other five pairs of SCR's in the rectifier bridge which are connected to the respective firing circuits A–2, B–1, B–2, C–1, and C–2.

Referring to the block A–1' in FIG. 3, a first SCR 90 has its anode connected directly to the upper end of the secondary winding 91 of the transformer 10 to which the 60 c.p.s. single-phase input power signal is applied. This transformer is a step-down transformer and the voltage across its secondary winding 91 preferably is on the order of 40 volts, in one practical embodiment of this invention. The cathode of SCR 90 is connected by a line 94 directly to the phase A output terminal $A_3$ of the rectifier bridge. This terminal is connected to the outer end of the phase A field winding 92 of the motor 13, whose complete three-phase winding is shown as Y-connected. The cathode of SCR 90 is also connected directly to an input terminal 70a' of the rectifier bridge which is connected directly to the output terminal 70 of the A–1 firing circuit. This SCR 90 also has a control electrode connected to an input terminal 70a' of the rectifier bridge which is connected directly to the output terminal 74 of the A–1 firing circuit.

The block A–1' in FIG. 3 also includes a second SCR 93 having its anode connected directly to the lower end of the transformer secondary winding 91, and its cathode connected directly to the phase A output terminal $A_3$ of the rectifier bridge. This cathode is also connected to an input terminal 69a' of the rectifier bridge which is connected directly to the output terminal 69 of the A–1 firing circuit. SCR 93 has its control electrode connected to an input terminal 72a' of the rectifier bridge which is connected directly to the output terminal 72 of the A–1 firing circuit.

The two SCR's 90 and 93 in the A–1' block in FIG. 3 have their cathodes connected directly to one another by the line 94.

When positive output triggering signals appear at the output terminals 74 and 72 of the A–1 firing circuit, both SCR's 90 and 93 are gated or triggered "on." That is, the control electrode of each SCR becomes positive with respect to its cathode. However, only one or the other of these two SCR's 90 and 93 will conduct power supply current at any instant because their anodes are connected resepctively to opposite ends of the transformer secondary winding 91. The cathodes of both these SCR's 90 and 93 are connected directly by a line 95 to one end of a firing bias resistor 99, whose opposite end also is connected directly to the center tap 97 on the transformer secondary winding 91.

Therefore, when the voltage across winding 91 is + to − from top-to-bottom in FIG. 3, then SCR 90 will conduct current and SCR 93 will not. Conversely, when the voltage across winding 91 is − to + from top-to-bottom in FIG. 3, then SCR 93 will conduct current and SCR 90 will not.

The other block A–2' of the phase A group of SCR's in the rectifier bridge has a pair of SCR's 100 and 101 connected anode-to-anode by line 94. The cathode of SCR 100 is connected directly to the lower end of the transformer secondary winding 91 and also to an input terminal 70a'' of the rectifier bridge which is connected directly to the output terminal 70 of firing circuit A–2. The cathode of SCR 101 is connected directly to the upper end of the transformer secondary winding 91 and to an input terminal 69a'' of the rectifier bridge which is connected directly to the output terminal 69 of the firing circuit A–2. SCR 100 has a control electrode connected to an input terminal 74a'' of the rectifier bridge which is connected directly to the output terminal 74 of the corresponding firing circuit A–2. SCR 101 has a control electrode connected to an input terminal 72a'' of the rectifier bridge which is connected directly to the output terminal 72 of firing circuit A–2.

With this arrangement, both SCR's 100 and 101 in the A–2' block are gated or triggered "on" when positive output triggering signals appear at the output terminals 72 and 74 of the A–2 firing circuit. However, only one or the other of these two SCR's will be conducting power supply current at any given time, depending upon whether the power supply voltage at that time across the transformer secondary winding 91 is + to −, or − to +, from top-to-bottom in FIG. 3.

The block B–1' of the phase B group of SCR's in the rectifier bridge of FIG. 3 has a pair of SCR's 102 and 103 whose cathodes are connected directly to each other by a line 104, which is connected to the phase B output terminal B₃ of the rectifier bridge. This terminal is connected directly to the outer end of the phase B field winding 105 of the motor 13. The anode of SCR 102 is connected directly to the upper end of the transformer secondary winding 91. The anode of SCR 103 is connected directly to the lower end of the transformer secondary winding 91.

SCR 102 has its control electrode connected directly to an input terminal 74b' of the rectifier bridge which is connected directly to the output terminal 74 of the B–1 firing circuit. The cathode of SCR 102 is connected to an input terminal 70b' of the rectifier bridge which is connected directly to the output terminal 70 of the B–1 firing circuit.

SCR 103 has its control electrode connected to an input terminal 72b' of the rectifier bridge which is connected directly to the output terminal 72 of the B–1 firing circuit. The cathode of SCR 103 is connected to an input terminal 69b' of the rectifier bridge which is connected directly to the output terminal 69 of the B–1 firing circuit.

Both cathodes of the SCR's 102 and 103 are connected through a line 106 to one end of a firing bias resistor 107, whose opposite end is connected to the center tap 97 on the transformer secondary winding 91.

With this arrangement, both SCR's 102 and 103 in the B–1' block are gated or triggered "on" in response to the triggering signals from the respective firing circuit B–1. However, only one or the other of these SCR's will actually conduct power supply current during a given half cycle of the 60 c.p.s. power supply voltage appearing across the transformer secondary winding 91.

The other block B–2' of the phase B group of SCR's in the rectifier bridge has a pair of SCR's 108 and 109 whose anodes are both connected to the aforementioned line 104.

The cathode of the SCR 108 is connected directly to the lower end of the transformer secondary winding 91 and to an input terminal 70b" of the rectifier bridge which is connected directly to the output terminal 70 of the B–2 firing circuit. SCR 108 has its control electrode connected to an input terminal 74b" of the rectifier bridge which is connected directly to the output terminal 74 of the B–2 firing circuit.

The cathode of SCR 109 is connected directly to the upper end of the transformer primary winding 91 and to an input terminal 69b" of the rectifier bridge which is connected directly to the output terminal 69 of the B–2 firing circuit. SCR 109 has its control electrode connected to an input terminal 72b" of the rectifier bridge which is connected directly to the output terminal 72 of the B–2 firing circuit.

With this arrangement, both SCR's 109 and 108 are gated or triggered "on" in response to the triggering signals from the respective firing circuit B–2. However, only one or the other of these two SCR's will actually conduct current during any particular half-cycle of the 60 c.p.s. power supply voltage appearing across the transformer secondary winding 91.

The block C–1' in the phase C group of SCR's in the rectifier bridge of FIG. 3 has a pair of SCR's 110 and 111, whose cathodes are connected to each other by the line 112, which is connected to the phase C output terminal C₃ of the rectifier bridge. This terminal is connected directly to the outer end of the phase C field winding 113 of motor 13. The anode of SCR 110 is connected directly to the upper end of the transformer secondary winding 91. The anode of SCR 111 is connected directly to the lower end of the transformer secondary winding 91.

SCR 110 has its control electrode connected to an input terminal 74c' of the rectifier bridge which is connected directly to the output terminal 74 of the C–1 firing circuit. The cathode of SCR 110 is connected to an input terminal 70c' of the rectifier bridge which is connected directly to the output terminal 70 of the C–1 firing circuit.

SCR 111 has its control electrode connected to an input terminal 72c' which is connected directly to the output terminal 72 of the C–1 firing circuit. The cathode of SCR 111 is connected to an input terminal 69c' of the rectifier bridge which is connected directly to the output terminal 69 of the C–1 firing circuit.

With this arrangement, both SCR's 110 and 111 in the C–1' block are triggered or gated "on" in response to triggering signals from the C–1 firing circuit. However, during any particular half cycle of the 60 c.p.s. power supply voltage appearing across the transformer secondary winding 91, only one or the other of these two SCR's will actually conduct power supply current.

The second block C–2' of the phase C group of SCR's in the rectifier bridge has a pair of SCR's 114 and 115 whose anodes are both connected to the aforementioned line 112.

The cathode of SCR 114 is connected directly to the lower end of the transformer secondary winding 91 and to an input terminal 70c" of the rectifier bridge which is connected directly to the output terminal 70 of the C–2 firing circuit. SCR 114 has its control electrode connected to an input terminal 74c" of the rectifier bridge which is connected directly to the output terminal 74 of the C–2 firing circuit.

SCR 115 has its cathode connected directly to the upper end of the transformer secondary winding 91 and to an input terminal 69c" of the rectifier bridge which is connected directly to the output terminal 69 of the C–2 firing circuit. SCR 115 has its control electrode connected directly to an input terminal 72c" of the rectifier bridge which is connected directly to the output terminal 72 of the C–2 firing circuit.

With this arrangement, both SCR's 114 and 115 are triggered or gated "on" in response to triggering signals from the respective circuit C–2. However, only one or the other of these two SCR's will actually conduct power current during any particular half cycle of the 60 c.p.s. power supply voltage appearing across the transformer secondary winding 91.

As already stated at the conclusion of the detailed discussion of FIG. 2, during the half-cycle of phase A of the low frequency reference signal when firing circuit A–1 is receiving a firing signal, the B phase firing circuit B–2 will receive a firing signal for the first 120° and the C phase firing circuit C–2 will receive a firing signal for the final 60°. Therefore, referring to FIG. 3, whenever the A–1 firing circuit is gating "on" the SCR's 90 and 93 in the A–1' block of the rectifier bridge and one or the other of these SCR's is conducting 60 c.p.s. power supply current (depending upon whether this is the positive or negative half cycle of the power supply), the power supply current will flow from one end of the transformer secondary winding 91 through this particular SCR 90 or 93 to line 94 and from there through the phase A field winding 92 of motor 13. This power supply current will return either (1) Through the phase B field winding 105, line 104, and through the SCR 108 or 109 in the B–2' block to the opposite end of the transformer secondary winding 91; or (2) Through the phase C winding 113, line 112, and through the respective SCR 114 or 115 in the C–2' block to the opposite end of the transformer secondary winding 91.

During the half-cycle of phase B of the low frequency reference signal when firing circuit B-1 is receiving a firing signal, the phase C firing circuit C-2 will receive a firing signal for the first 120° and the phase A firing circuit A-2 will receive a firing signal for the final 60° as indicated by the wave forms shown at lines B, $\overline{C}$, and $\overline{A}$ in FIG. 1.

Therefore, whenever the B-1 firing circuit is gating "on" the SCR's 102 and 103 of the B-1' block of the rectifier bridge (FIG. 3), one or the other of these SCR's is conducting 60 c.p.s. power supply current (depending upon whether this is the positive or negative half cycle of the power supply). The power supply current will flow from one end of the transformer secondary winding 91 through this particular SCR 102 or 103 to line 104 and through the phase B field winding 105 of motor 13. This power supply current will return to the opposite end of the transformer secondary winding 91 either:

(1) Through the phase C field winding 113, line 112, and through the respective SCR 114 or 115 in the C-2' block; or (2) Through the phase A field winding 92, line 94, and through the respective SCR 100 or 101 in block A-2'.

During the half cycle of phase C of the low frequency reference signal when firing circuit C-1 is receiving a firing signal, the phase A firing circuit A-2 will receive a firing signal for the first 120° and the phase B firing circuit B-2 will receive a firing signal for the final 60°, as indicated by the wave forms at lines C, $\overline{A}$, and $\overline{B}$ in FIG. 1. Therefore, whenever the C-1 firing circuit is gating "on" the SCR's 110 and 111 the C-1' block of the rectifier bridge (FIG. 3) and one or the other of these SCR's is conducting 60 c.p.s. power supply current (depending upon whether this is the positive or negative half cycle of the power supply), the power supply current will flow through this particular SCR 110 or 111 to line 112 and through the phase C winding 113 of motor 13. This power supply current will return either (1) Through the phase A winding 92, line 94, and through the respective SCR 100 or 101 in the A-2' block to the opposite end of the transformer secondary winding 91; or (2) Through the phase B winding 105, line 104, and through the respective SCR 108 or 109 in the B-2' block to the opposite end of the transformer secondary winding 91.

From the foregoing explanation it will be evident that in the three-phase rectifier bridge shown in FIG. 3 the time-width of the 60 c.p.s. power supply voltage is modulated in accordance with the operation of the six firing circuits A-1, A-2, B-1, B-2, C-1 and C-2 of FIG. 1, so that the volt-seconds applied to the field windings of the motor 13 are integrated by these windings substantially in accordance with the low frequency sinusoidal curve 87 in FIG. 7.

Each firing circuit A-1, A-2, B-1, B-2, C-1 or C-2 produces output triggering signals at different times during successive half-cycles of the 60 c.p.s. power supply voltage, the time of firing becoming progressively earlier for successive half-cycles of the power supply voltage while the low frequency (e.g. 3 c.p.s.) firing signal for that firing circuit is increasing in amplitude (i.e., during the first 90° of the positive half-cycle of this firing signal). When the firing circuit produces output signals for the first time during any particular half-cycle of the 60 c.p.s. power supply voltage, these output signals turn on the two SCR's in the corresponding block of the rectifier bridge of FIG. 3 permitting the remainder of that particular half-cycle of the power supply current to pass to the respective field windings of the motor. For example, referring to FIGS. 6 and 7, during the first half-cycle of the power supply, no power supply current is passed to the phase A field winding 92 of the motor because the corresponding firing icrcuit A-1 does not fire at all during this half-cycle. Toward the end of the second (negative) half-cycle of the power supply, the firing circuit A-1 fires, producing output signals which turn on the SCR's 90 and 93 in block A-1' of the FIG. 3 rectifier bridge. One or the other of these two SCR's will pass this negative power supply as positive to the phase A winding 92, as indicated by the shaded area just before the time 2 in FIG. 7. Then at an earlier time during the third (positive) half-cycle of the power supply current, the firing circuit A-1 fires, producing triggering signals which again turn on the SCR's 90 and 93 in block A-1' of the rectifier bridge. The other of these SCR's will pass this positive power supply current as positive current to the phase A winding 92, as indicated by the shaded area in FIG. 7 just ahead of the time 3. Similar actions take place during succeeding half-cycles of the power supply so that positive current is applied to the phase A winding 92 in discrete segments, as represented by the shaded areas in FIG. 7. The motor 13 integrates these discrete current segments and operates as if energized by the low frequency sinusoidal wave form 87 in FIG. 7.

A similar action takes place at the phase B and phase C components of the present control circuit.

As shown in FIG. 1, the motor 13 is not only operable by the output of the rectifier bridge 12 but also can be connected directly to a three-phase voltage supply indicated by the lines L1, L2, L3. The motor is connected and disconnected from this three-phase voltage supply by the operation of a relay 120. When the motor 13 is a press drive motor, the relay 120 is actuated to energize the motor for normal operating speed and suitable speed control means is provided for controlling the speed of the motor during its normal operation. However, when it is desirable to operate the motor at a creep speed, the relay 120 is de-energized and a relay 121 is energized to connect the transformer 10 across the phases L1, L2 of the three-phase power supply. Accordingly, the present invention provides a simple way for obtaining wide ranges in the speed of a press motor from a single three-phase power supply, three phases being used for normal high speed operation and a single phase being utilized and converted for creep speed operation.

In accordance with the present invention, the motor torque can be increased by connecting the output of the rectifier bridge 12 simultaneously to *both* the stator winding and the rotor winding of the motor 13, but in opposite phase sequences, so that the motor will tend to run at a speed twice that of its speed if only one of these windings were so energized. Alternatively, in order to increase the motor torque, the output of the rectifier bridge 12 may be connected to either the stator winding or the rotor winding and D.C. applied to the other winding in the motor.

From the foregoing description it will be evident that the particular embodiment of this invention which is shown in the accompanying drawings is capable of accomplishing the stated objects and advantages of the present invention. However, while a presently-preferred embodiment has been disclosed in detail, it is to be understood that the present system is susceptible of other embodiments and may be used in a different manner from the specific example given.

For example, the output of the conversion circuit 12 of the present system may be connected to either the primary circuit or the secondary circuit of the motor to energize the latter for reduced speed operation.

Also, the specific examples of the power signal frequency and the reference signal frequency are to be understood as illustrative only, without intending thereby to limit the invention. Thus, for example, if desired, the power signal frequency may be on the order of 3000 cycles per second and the reference signal frequency may be from 20 to 600 cycles per second.

The reference signal source instead of an oscillator, may be an inverter or a motor-generator, if desired. Also, the reference signal may be a cyclically fluctuating D.C. signal, instead of an A.C. signal.

Therefore, it is to be understood that various modifications, omissions, and adaptations which depart from the disclosed embodiment of the present system may be adapted without departing from the scope of this invention.

What is claimed is:

1. In an electrical conversion system for converting from single-phase electrical power to lower frequency polyphase electrical power on respective phase connections comprising a power source providing alternating single-phase power, a reference source providing reference signals of only a fraction of the frequency of said polyphase power and having envelopes approximating the envelopes of the phases of the polyphase power said reference signals being phase displaced to correspond to the phases of said polyphase power, a conductive device for each phase connection for conducting the single phase power to the phase connection during a half-cycle of said single-phase power in a forward direction thereacross, each of said devices having a control electrode and conducting for the remaining portion of said half-cycle thereacross when rendered conductive by a signal on said control electrode, a plurality of triggering means including a respective triggering means for applying triggering signals to each said device for each phase connection, each triggering means comprising energy responsive means for providing a triggering signal for said device of the corresponding phase during said half-cycle of said single-phase power during and at a time which is dependent on the magnitude of said reference signal, and means for applying said reference signals to the respective triggering means for said phases.

2. A system for converting a substantially constant frequency, single-phase power signal to a three-phase power signal having a substantially lower effective frequency and energy content comprising:
a three-phase rectifier bridge having three different phase groups of controlled rectifiers, each having a control electrode, and three different phase output terminals, each connected to a respective phase group of the rectifiers;
means for applying as an input signal simultaneously to all of said rectifiers a single-phase A.C. power signal of a substantially constant frequency;
a plurality of firing circuits coupled respectively to the control electrodes of said rectifiers in the bridge for applying respective triggering signals to the latter to render the respective rectifier conductive to pass the power signal to the respective phase output terminal;
means for producing reference signals of three different phases each having a frequency which is only a fraction of the power signal frequency;
and means for operating each of said firing circuits by the respective reference signal to produce the respective triggering signal at a time during the respective half-cycle of the power signal which is dependent upon the amplitude of the respective reference signal to render the respective controlled rectifier in the bridge conductive to pass the power signal to the respective phase output terminal for the remainder of said half cycle.

3. A system according to claim 2 wherein each of said phase groups of rectifiers comprises:
a first rectifier connected to conduct said power signal during a positive half cycle of the latter, said first rectifier having its control electrode connected to receive a triggering signal from the respective firing circuit during a positive half-cycle of the reference signal of the same phase;
a second rectifier connected to conduct said power signal during a positive half-cycle of the latter, said second reference signal having its control electrode connected to receive a triggering signal from the respective firing circuit during a negative half-cycle of the reference signal of that same phase;
a third rectifier connected to conduct said power signal during a negative half-cycle of the latter, said third rectifier having its control electrode connected to receive a triggering signal from the respective firing circuit during a positive half-cycle of the reference signal of that same phase;
and a fourth rectifier connected to conduct said power signal during a negative half cycle of the latter, said fourth rectifier having its control electrode connected to receive a triggering signal from the respective firing circuit during a negative half-cycle of the reference signal of that same phase.

4. A system according to claim 3 wherein each of said firing circuits comprises:
a capacitor;
a charging circuit for said capacitor, means in said charging circuit causing said capacitor to be charged at a rate which depends upon the amplitude of the incoming reference signals;
voltage responsive means coupled to said capacitor for producing said triggering signal when the capacitor is charged to a predetermined potential;
and means for discharging said capacitor at the end of each half-cycle of the power signal, such means comprising means for detecting the crossing of zero by said power signal.

5. An electrical conversion system for changing the frequency of an alternating current first voltage of a first frequency to that of an alternating current voltage of a second lower frequency comprising first circuit means for applying said first voltage to an alternating current load comprising normally non-conductive circuit elements which can be rendered conductive in response to a control signal applied during a given half-wave of said first wave to conduct current to said load and becoming non-conductive at the end of the half-wave, said elements comprising first elements including a respective element for conducting positive and negative half-cycles of said first voltage to said load with one polarity and second elements including respective elements for conducting positive and negative half-cycles of said first voltage wave to said load with the opposite polarity, a first triggering circuit for supplying control signals to said first elements, a second triggering circuit for supplying control signals to said second elements, each of said triggering circuit comprising energy storage means for storing electrical energy in dependence on the magnitude and time period of the application of an electrical input thereto, a substantially constant direct current voltage connected to said storage means to supply energy thereto, control means for varying the rate which said energy is stored in said storage means from said direct current source in accordance with the magnitude of an input signal of a given polarity, means for applying an alternating current reference voltage of said lower frequency to each of said control means as said input signal comprising means for applying one half-cycle of said reference voltage to said first triggering circuit means and means for applying the other half-cycle of said reference voltage to said second triggering circuit with the necessary polarity to control the charging of the storage means in accordance with the magnitude of the applied half-wave, each of first and second circuit means comprising reset means actuable in response to a pulse signal for preventing the storage of energy in said storage means and for discharging energy stored therein, and means responsive to each excursion of said first voltage wave to zero to provide a pulse signal to each said reset means to momentarily activate the latter, and means for applying a signal to activate each of said reset means during the half-cycle of said reference voltage in which the other of said triggering circuits is to control conduction to said load.

6. In an electrical conversion system, a source of three-phase power of frequency $f$ having single phases, phase displaced by about 120°, a three-phase load, a frequency converting circuit connected across a single phase of said source, for supplying three-phase power to said load at a lower frequency F, means for selectivity connecting said load to said source or to said conversion system to selectively energize said load with power of frequency f or frequency F, said frequency conversion system comprising means providing a first reference signal, and second and third reference signals displaced 120° and 240° respectively from said first reference signal, first, second and third triggering means controlled by said first, second and third reference signals respectively, each of said trigering means comprising first and second triggering circuits controlled by the corresponding reference signals and responsive to the positive and negative half-waves respectively of said reference signals, each of the triggering circuits comprising a capacitor, means for charging said capacitor from a substantially constant voltage direct current source, means for discharging said capacitor and providing a pulse signal in response to a predetermined charge on said capacitor, and means responsive to an electrical input of a predetermined polarity for controlling the rate of charging of said condenser from said direct current source, each of said triggering circuits having the half-wave reference signal to which it is to be responsive applied thereto as said electrical input, and each further comprising a circuit element connected across the capacitor thereof activatable between a first condition in which the capacitor is chargeable by said source and a second condition for discharging the capacitor and inhibiting the charging thereof, circuit means connected to each triggering circuit for applying a signal to activate each of said circuit elements when the half-wave of the corresponding reference signal is of a polarity to be integrated by the other triggering circuit for the reference signal, a pair of switching elements for each triggering circuit, said elements each comprising load electrodes and a control electrode adapted to switch said elements on when a voltage of proper polarity is applied across said load electrodes, said elements each conducting when switched on until the voltage across said load electrodes drops to substantially zero or is reversed in polarity, the switching elements corresponding to said first and second triggering circuits being connected between said single phase of said power source and three phase output terminals corresponding to respective ones of said reference signals and the corresponding triggering means controlled thereby, said switching elements for said first triggering circuits of said triggering means being connected to their respective phase terminals to conduct both positive and negative half-waves of said single phase to the terminals with one polarity and the said switching elements for said second triggering circuits being connected between said single phase and the respective output terminals to conduct both positive and negative half-waves of said single phase with a polarity opposite to the polarity of the switching elements controlled by said first triggering circuits, and reset circuit means for sensing each time the single-phase power means crosses zero and for applying a pulse signal to said triggering circuits to momentarily activate the circuit element of each operating triggering circuit to discharge the capacitor thereof.

7. Frequency conversion system comprising:
a steady D.C. power source;
a capacitor;
a charging circuit connected between said power source and said capacitor, said charging circuit including a charging transistor, means for producing a low power alternating current reference signal for controlling the conductivity of said transistor in accordance with the magnitude of one half cycle of the reference signal whose magnitude fluctuates cyclically at a predetermined frequency to control the charging of said capacitor; a unijunction transistor having output electrodes and a control electrode, impedance means connecting said unijunction transistor to said power source, and means coupling said control electrode to said capacitor to turn on said unijunction transistor in response to a predetermined charge on said capacitor; output circuit means connected to said power source and coupled to said unijunction transistor to produce an output signal in response to the turning on of said unijunction transistor; a reset transistor connected across said capacitor, means for producing a cyclic power supply signal for tuning on said reset transistor to discharge said capacitor at the end of a cyclic variation from zero of the power supply signal which fluctuates cyclically at a frequency several times that of said reference signal, and means coupled to the reference signal producing means for turning on said reset transistor during the other half cycle of said reference signal.

8. A frequency conversion system according to claim 7, wherein said output circuit means comprises a transformer and an output transistor, said transformer having a primary winding connected in series with said output transistor across said power source, and said output transistor having a control electrode connected to said unijunction transistor to turn on the output transistor in response to current flow through said unijunction transistor so as to develop a voltage across said primary winding of the output transformer.

References Cited
UNITED STATES PATENTS

| | | | |
|---|---|---|---|
| 3,183,372 | 5/1965 | Chin | 318—341 X |
| 3,247,432 | 4/1966 | Robinson | 318—171 X |
| 3,256,244 | 6/1966 | Byloff et al. | 321—69 X |
| 3,289,071 | 11/1966 | Rosenberry | 307—301 X |
| 3,319,147 | 5/1967 | Mapham | 321—60 X |
| 3,332,002 | 7/1967 | Jollois | 321—69 X |
| 3,394,299 | 7/1968 | Lawn et al. | 321—11 |
| 3,221,188 | 11/1965 | Bozeman | 307—301 X |
| 3,249,838 | 5/1966 | Mierendorf | 318—257 |
| 3,355,653 | 11/1967 | Paradissis | 321—18 X |
| 3,435,321 | 3/1969 | Brandt | 321—7 |

FOREIGN PATENTS 130,104 10/1959 Russia.

OTHER REFERENCES

G.E. Silicon Controlled Rectifier Manual, "Synchronization Methods," 1961, 2nd ed., pp. 50, 51.

J. D. MILLER, Primary Examiner

W. H. BEHA, JR., Assistant Examiner

U.S. Cl. X.R.

318—171, 231, 341; 321—60